United States Patent
Rozier

(10) Patent No.: US 10,713,587 B2
(45) Date of Patent: Jul. 14, 2020

(54) METHOD AND SYSTEM USING MACHINE LEARNING TECHNIQUES FOR CHECKING DATA INTEGRITY IN A DATA WAREHOUSE FEED

(71) Applicant: Xerox Corporation, Norwalk, CT (US)

(72) Inventor: David Rozier, Bernin (FR)

(73) Assignee: Xerox Corporation, Norwalk, CT (US)

( * ) Notice: Subject to any disclaimer, the term of this patent is extended or adjusted under 35 U.S.C. 154(b) by 1035 days.

(21) Appl. No.: 14/935,934

(22) Filed: Nov. 9, 2015

(65) Prior Publication Data
US 2017/0132525 A1    May 11, 2017

(51) Int. Cl.
*G06N 20/00* (2019.01)
*G06F 16/215* (2019.01)
*G06Q 10/10* (2012.01)

(52) U.S. Cl.
CPC .......... *G06N 20/00* (2019.01); *G06F 16/215* (2019.01); *G06Q 10/10* (2013.01)

(58) Field of Classification Search
CPC . G06N 99/005; G06N 20/00; G06F 17/30303
See application file for complete search history.

(56) References Cited

U.S. PATENT DOCUMENTS

2008/0306984 A1* 12/2008 Friedlander ............ G16H 10/60
2013/0179394 A1*  7/2013 Simitsis ............ G06F 17/30563
                                                          707/602

OTHER PUBLICATIONS

Rahm, Erhard, and Hong Hai Do. "Data cleaning: Problems and current approaches." IEEE Data Eng. Bull. 23.4 (2000): 3-13. (Year: 2000).*
Du, Peng, et al. "Algorithm-based fault tolerance for dense matrix factorizations." Acm sigplan notices 47.8 (2012): 225-234. (Year: 2012).*
Kaloyanova, Kalinka Mihaylova. "Improving data integration for data warehouse: a data mining approach." Available in: http://www.nbu. bg (2005). (Year: 2005).*
Veasey et al., "Anomaly Detection in Application Performance Monitoring Data", Aug. 19, 2013, 7 pages.
Erhard Rahm & Hong Hai Do; "Data Cleaning: Problems and Current Approaches"; IEEE Data Engineering Bulletin, vol. 23, 2000.

* cited by examiner

*Primary Examiner* — Eric Nilsson
(74) *Attorney, Agent, or Firm* — Fay Sharpe LLP

(57) ABSTRACT

This disclosure provides a method and system to perform data integrity checks in a data warehouse (DWH) feed using machine-learning (ML) processes. According to an exemplary method, a ML integrity check is performed on received data which has been extracted from a plurality of source files, and after ML processes validate the extracted data, the validated data is transformed and loaded to a DWH.

10 Claims, 2 Drawing Sheets

METHOD AND SYSTEM USING MACHINE LEARNING TECHNIQUES FOR CHECKING DATA INTEGRITY IN A DATA WAREHOUSE FEED

BACKGROUND

Data quality in data warehouses (DWH) is a common sore point across all IT departments. In order to assure the usability of a DWH, data quality must be checked, and data corruption addressed. Unfortunately, this process of data integrity check is highly time consuming, as it is difficult to fully automatize: some basic tests can be automatic, but they are too rigid, and human expertise is commonly required to perform deeper qualitative checks. It is also a recurrent task, since a clean data stream at one point in time often gets corrupted at source at any later point in time.

In one example of data corruption issue, for a given field, the following temporal series of values: [5, 4, 5, 4, 3, 6, 4, 5, 112, 5, 4, 8, 4, 6, 5, 10, 4, 6 . . . ] can probably trigger statistical monitoring techniques, and raise an alert signaling that at least the data value of 112 is an abnormal value. This alert will then need investigating by a human expert. However, if the value 112 was replaced by 8, whether it would trigger an alert is all dependent on rigid parameterization.

Also, when dealing with non-numerical fields, the use of statistical methods requires setting up distance metrics in order to be able to compute a measure of distance between two values. Such methods can be hard to setup and maintain.

Many systems claim to be performing data integrity checks. Every system has its own tests and performance; however they all have in common to be using fix rule-based checks. The main disadvantages are therefore a low coverage of possible errors, and a total incapability of detecting errors that do not correspond to the fixed catalogue of possible errors.

A survey of different approaches and techniques has been undertaken in 2000. See Data Cleaning: Problems and Current Approaches (2000), Erhard Rahm & Hong Hai Do, in IEEE Data Engineering Bulletin, Volume 23, 2000. It shows that systems are largely organized around coping with types of errors that are listed and documented. It shows very little generic character, and I did not see any machine learning techniques.

However, it is important to point out that different techniques are complementary. Documented errors spotting in some rule-based systems will allow, for example, the detection of some misspellings of common names. This can probably not be done through machine learning techniques. For a global coverage of data integrity, it is relevant to think about combining traditional rule-based systems together with machine learning techniques.

To summarize, the issues met by current systems are: automatic methods are not generic enough; high labor cost of human checks; low coverage of human checks; high operational impact resulting from this low coverage; and high labor cost of containment measures.

This disclosure proposes a system where these issues are all lessened, by using unsupervised and supervised machine techniques, enabling automatic checks to be performed, to a certain degree without any training set, and to a higher level of coverage after labeling has been performed by a human expert, hence bridging the gap between fully automatic anomaly detection methods that are too shallow, and human deep monitoring methods that are inapplicable since too time consuming.

INCORPORATION BY REFERENCE

Anomaly Detection in Application Performance Monitoring Data, Thomas Veasey and Stephen Dodson, ICMLC 2014 (6th International Conference on Machine Learning and Computing); and Data Cleaning: Problems and Current Approaches (2000), Erhard Rahm & Hong Hai Do, in IEEE Data Engineering Bulletin, Volume 23, 2000; are incorporated herein by reference in their entirety.

BRIEF DESCRIPTION

In one embodiment of this disclosure, described is a computer-implemented method for performing automated data quality checks. The method includes: extracting, with an extraction module, data from a plurality of source databases and source files; automatically validating, with a machine-learning integrity check module, the extracted data by assigning an integrity status thereto; transforming, with a transformation module, the validate data into at least one temporary table; loading, with a loading module, the transformed data into a data warehouse feed system for storage; and at least one of: correcting, with a correction module, the data stored in the data warehouse feed system; and displaying, on a display, the stored data.

In another embodiment of this disclosure, described is a system for performing automated data quality checks. The system includes an extraction module programmed to extract data from a plurality of source databases and source files. A machine-learning integrity check module is programmed to automatically validate the extracted data by assigning an integrity status thereto. A transformation module is programmed to transform the validated data into at least one temporary table. A loading module is programmed to load the transformed data into a data warehouse feed system for storage. A correction module is programmed to correct the data stored in the data warehouse feed system. A display is configured to display the stored data.

In still another embodiment of this disclosure, described is a system for performing automated data quality checks. The system includes an extraction module programmed to extract data from a plurality of source databases and source files. A machine-learning integrity check module is programmed to automatically validate the extracted data by assigning an integrity status of sound or suspicious thereto. The machine-learning integrity check module further includes a quarantine module programmed to store at least one suspicious data; a human expert verification and correction module programmed to correct the at least one suspicious data; and a training database configured to store at least one corrected suspicious data. A transformation module is programmed to transform the validated data into at least one temporary table. A loading module is programmed to load the transformed data into a data warehouse feed system for storage. A correction module is programmed to correct the data stored in the data warehouse feed system. A display is configured to display the stored data.

DETAILED DESCRIPTION

This disclosure provides a method and system for checking data integrity in a data warehouse (DWH) feed by inserting any machine learning algorithm in the heart of an Extract-Transform-Load (ETL) mechanism associated with the DWH in order to address data quality issues of the DWH. The disclosed method and system allows an unsupervised triage between good and bad data additionally to the supervised triage based on feedback provided at the end of the load, such as post load label and on correction proposed on rejected data (i.e. quarantine correction).

Stated another way, this disclosure provides a method and system for automated data quality checks for a data warehouse feed system, using machine learning techniques to perform data checks in an automatic way, but with the capability of taking into account expert domain knowledge. In addition, a synthetic system is provided whereby these techniques can be integrated within a classic Extract-Transform-Load (ETL) system. Advantageously, the automatic data quality checks do not require the data quality checking by human intervention, thereby increasing the speed of the methods and system of the present disclosure.

According to an exemplary embodiment, the method uses machine-learning techniques for the purpose of an automated data quality check within the loading process of a data warehouse.

According to another exemplary system, used is such a method in a way that is compatible with conventional Extraction-Transformation-Loading (ETL) software. Within the system, an integrity check module is not configured to one particular machine-learning technique. Conversely, the integrity check module can use different machine learning techniques in conjunction, and choose the best algorithm for each data warehouse. Advantageously, the machine-learning techniques improve the efficiency and performance of the methods and system of the present disclosure over time as the number of erroneous data decreases, thereby reducing the amount of time for human intervention.

Figure 1:
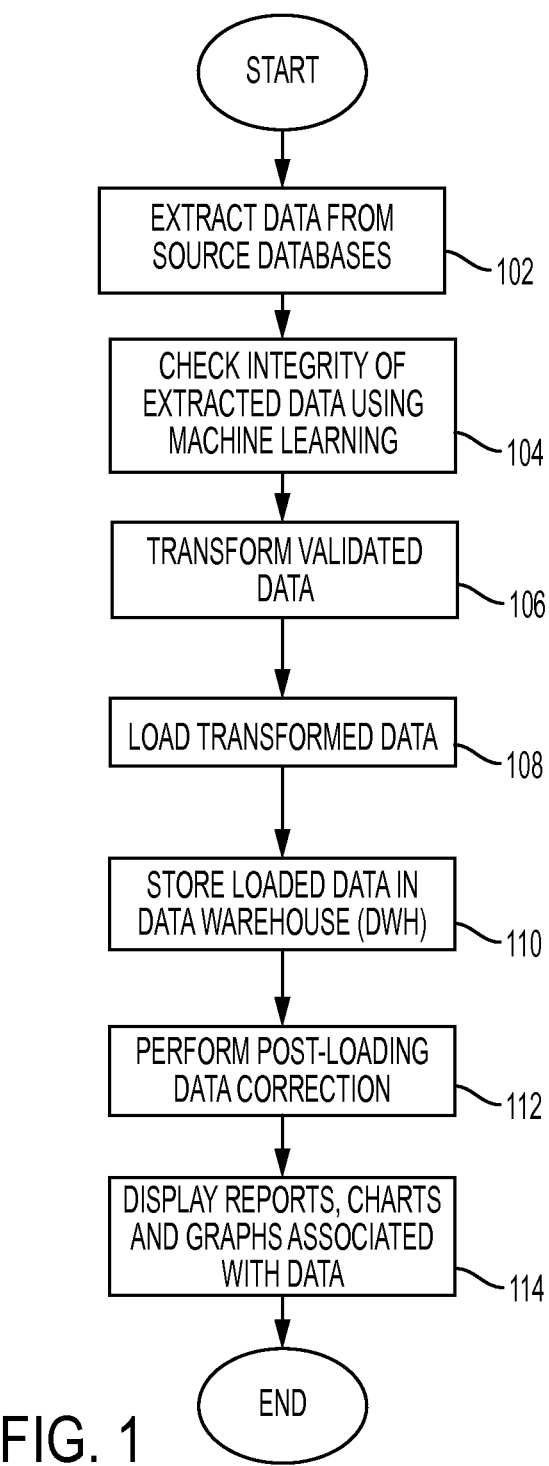
FIG. 1 is a flow chart of a method to check the data integrity of a data warehouse (DWH) feed using machine learning processes according to an exemplary embodiment of this disclosure.

With reference to FIG. 1, shown is a flow chart of a method to check the data integrity of a DWH feed using machine learning processes according to an exemplary embodiment of this disclosure.

The method includes: extracting data from source databases 102; check integrity of extracted data using machine learning 104; transform the validated data 106; load the transformed data 108; store the loaded data in a DWH 110; perform post-loading data correction 112; and display reports, charts, and graphs associated with data 114.

At 102, data is extracted from source databases. In a typical ETL method, the extraction is focused on fast but robust transfer of data from the generating sources of data. The focus is on speed and robustness because some sources, such as databases, have to be 'frozen' in a state in order to have synchronization in time between the different sources. During this frozen time, data are usually still generated by devices, but stored in limited memory space, since the databases are not updated. This limited memory space means the length of time during which the source databases are frozen must be short and with little variability.

Hence, no modification or calculation is made during this extraction step. Rather, the extraction is a mechanical transfer of data from original sources toward offline storage. In one illustrative example, since no modification is made to a sample data table titled "MeterReads", the extracted data can be stored in a source local database or a DWH as a MeterReads table.

At 104, the integrity of extracted data is automatically checked using machine learning techniques. For example, the extracted data is validated by being assigned an integrity status of "Sound" or "Suspicious." Data with a status of "Sound" is transformed (as described in more detail below). Data with a status of "Suspicious" is quarantined, and further processed. The "Suspicious" data is then analyzed to determine: (1) whether the data was incorrectly assigned a status of "Suspicious" (i.e., the data should have been assigned a status of "Sound"); or (2) whether the data has an incorrect value (i.e., the data value is wrong). In the case of data with an incorrect status, the status is corrected and transmitted for transformation. In the case of data with incorrect values, the values are corrected, the status of the data is changed from "Suspicious" to "Sound". The changed data is then re-checked using the machine-learning techniques. Since the corrected data now has a status of "Sound", it can be transformed. In some examples, changed data is collected (i.e., in a database) for machine-learning techniques.

One example of Machine learning technique that can be used for the Integrity check is a Matrix Factorization method. Below is a basic implementation in Matlab that proved the feasibility:

```
T = csvread('sample1.csv',1,1);
T(:,:,end+1) = csvread('sample2.csv',1,1);
T(:,:,end+1) = csvread('sample3.csv',1,1);
T(:,:,end+1) = csvread('sample4.csv',1,1);
T(:,:,end+1) = csvread('sample5.csv',1,1);
T = tensor(T); %requires the Matlab tensor toolbox
remse = [ ]
for k=1:4 %loop over the ranks
    P = cp_als(T,k);
    %compute the error for this rank
    rmse(k) = sqrt( norm(T)^2 + norm(P)^2 - 2 * innerprod(T,P) )
end
plot(1:k,rmse,'.-')
xlabel('rank of the approximating tensor')
ylabel('Root Mean Squared Error')
%this plot has a plateau after rank 3, so it makes sense to choose k=3
as
a
%good approximation
%% find residual values that are extreme (very large or very small)
k=3;%choose the rank that seems to fit the data perfectly
residuals = full(P) - full(T)
% first make an histogram to identify a confidence interval around the
mean
% prediction
hist((residuals(:)),30) %show residuals
PF = full(P);
Pv = PF(:);
Tv = T(:);
%we found 0.03 as a reasonable confidence interval by looking at the
%histogram
I = find(residuals(:) < -.03);
for i=1:length(I)
    s = tt_ind2sub([20,5,5], I(i));
    fprintf('Value abnormally large in entry [%s], it should be %4.3f
instead of %4.3f\n',...
        num2str(s), Pv(I(i)), Tv(I(i)));
end
I = find(residuals(:) > .03);
for i=1:length(I)
    s = tt_ind2sub([20,5,5], I(i));
    fprintf('Value abnormally small in entry [%s], it should be %4.3f
instead of %4.3f\n',...
        num2str(s), Pv(I(i)), Tv(I(i)));
end
```

At 106, the validated data is transformed. This operation can be where most of the complexity occurs in the feeding of a DWH. During transformation, one or more new fields and/or new temporary tables are created. Additionally, existing tables and/or fields are modified, according to a set of complex algorithms for aggregations and calculations.

This operation takes as an input what is called 'raw data', (i.e. data that have not been modified), and produces data that should more functional meaning, since they have been calculated or aggregated along algorithms that represent the knowledge of the functional domain.

In the illustrated example, the table MeterReads is still present after the transformation step, but a table MonthlyPrintVolume is created with values that calculated with the appropriate algorithm from the data in MeterReads.

At 108, the transformed data is loaded. The loading operation requires less domain-specific knowledge. It consists of the integration of the newly loaded and calculated data into the existent table values. The extraction and transformation operations do not extract and transform all data from the start of history, but only for a finite time period, for example the process is repeated every day on the data generated in the last 24 hours.

At 110, the loaded data is stored in the DWH feed system (not shown in FIG. 1). The loading operation needs to incorporate this latest 'chunk' of data into the DWH for storage, since one of the reasons to maintain a DWH is to keep long history of data. This integration is fairly mechanical but not trivial, since depending on the type of data, it may mean simply the addition of new lines, but also sometimes the appropriate modification of existent lines as a result of information contained in a new line. In one example, one printer was added in the fleet in the last 24 hours, and one printer was removed. At the end of the loading step, the line corresponding to the removed printer in the Assets table is modified (the field 'IsPresent' is changed for TRUE to FALSE), and one new line is created, for the new printer.

At 112, post-loading data correction is performed on the data stored in the DWH feed system. These corrections are happening when a discrepancy is discovered at data usage or visualization time by automated reports or human experts. The corrected data, which is corrected by human experts, is transferred for transformation and that same data is now explicitly labeled as "sound" and is incorporated into the training data, so machine-learning can occur.

At 114, the stored data is displayed on a display. The data can include reports, charts, and graphs associated with the stored data.

Figure 2:
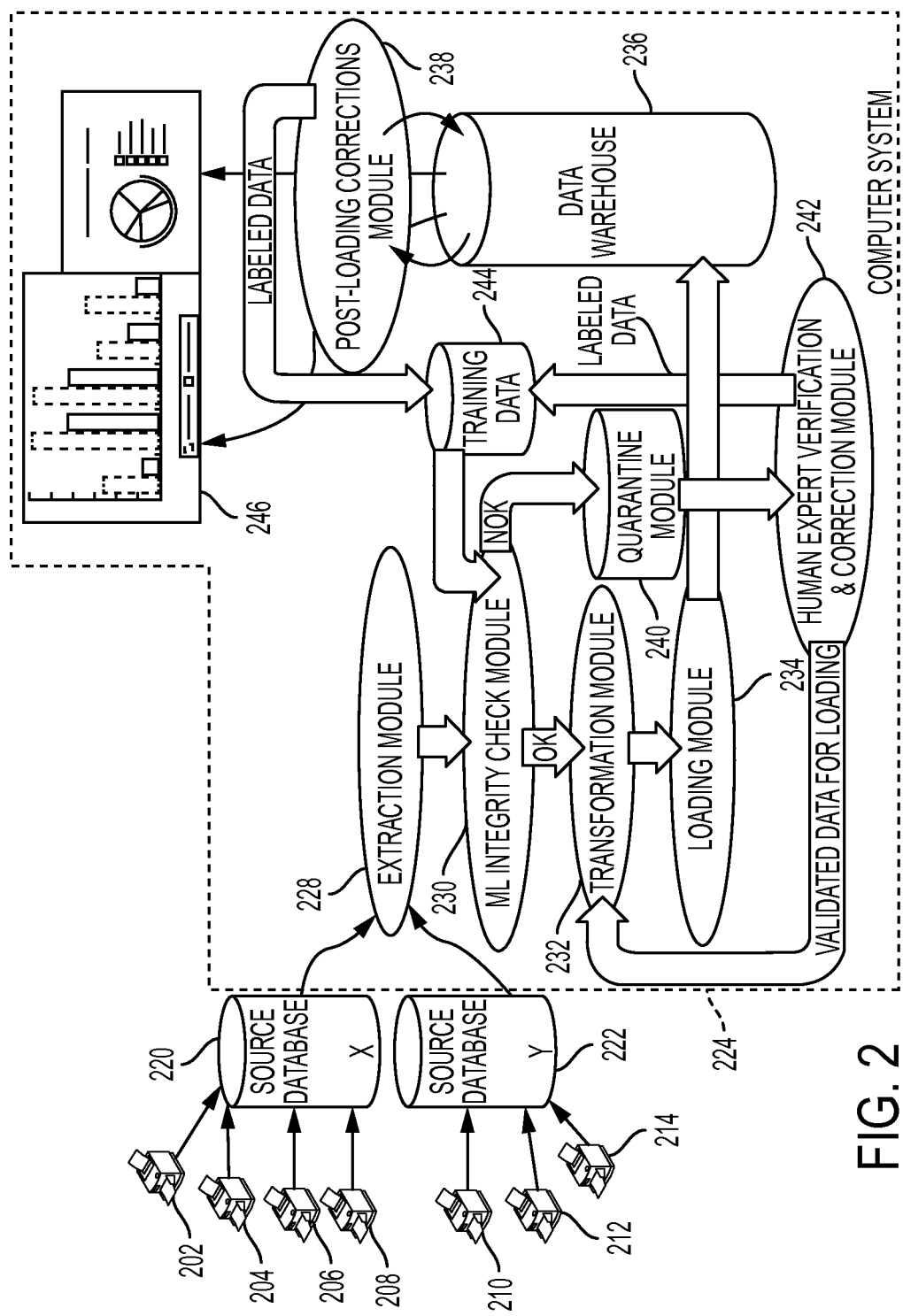
FIG. 2 is a block diagram of a system to check the data integrity of a DWH feed using machine learning processes according to an exemplary embodiment of this disclosure.

With reference to FIG. 2, shown is a block diagram of a system 200 to implement the method to check the data integrity of a DWH feed using machine learning processes according to an exemplary embodiment of this disclosure.

The system 200 includes at least one input. The at least one input is commonly composed of at least one source file 202-214 and at least one source database 220 and 222. In one example, the sources files 202-214 can be a fleet of printers. In some embodiments, some of the printers 202-208 can be in communication with a first source database 220, and the remaining printers 210-214 can be in communication with a second source database 222. It will be appreciated that any number of source files 202-214 can be in communication with any number of course databases 220, 222.

The system 200 can also include a computer system 224. The computer system 224 is in communication with the source databases 220 and 222. In one example, the source databases 220, 222 and the computer system can be located in a single location (e.g., an office). In another example, the source databases 220, 222 can be located in a first location (e.g., an office) and the computer system 224 can be located in a second location (e.g., data gathering center). In some embodiments, the computer system 224 can include an extraction module 228, a machine-learning (ML) integrity check module 230, a transformation module 232, a loading module 234, a data warehouse (DWH) feed system 236, and a post-loading corrections module 238. Each of these components 228-238 are described in more detail below.

The extraction module 228 is programmed to mechanically extract all data from the source databases 220 and 222 in order to gather them in a uniform format, for example, a technical database schema or flat files. The extraction module 228 can be connected physically (e.g., with a cable) or electronically (e.g., via a wireless network) to the source databases 220 and 222. The extraction module 228 is also programmed to transmit the extracted data to the ML integrity check module 230.

The ML integrity check module 230 is programmed to automatically check the integrity of the extracted data before the data is transmitted to the transformation module 232. Advantageously, the automatic checking of the integrity of the data (e.g., by the computer system 224, and not by a human) increases the efficiency of the computer system 224, while reducing the amount of time for a human user to manually validate the data. To automatically check the integrity of the extracted data, the ML integrity check module 230 can be configured as a two-class classifier to validate the extracted data. For example, the ML integrity check module 230 can classify (or otherwise label) each table or file as "Sound" or "Suspicious". Data that is labeled as "Sound" are transmitted to the transformation data module 232. Data that is labeled as "Suspicious" are diverted for further processing. To do so, the ML integrity check module 230 includes a quarantine module 240, a human expert verification and correction module 242, and a training database 244, as described in more detail below.

For example, an extracted data set that includes the values [5, 4, 5, 4, 3, 6, 4, 5, 112, 5, 4, 8, 4, 6, 5, 10, 4, 6 . . . ] can be validated by the ML integrity check module 230. The data with values of "3", "4", "5", and "6" are validated and labeled as "Sound", and are sent to the transformation module 232. The data with values of "112", "8", and "10" are transmitted to the quarantine module 240. The "Suspicious" data remains in the quarantine module 240 until a human user retrieves the "Suspicious" data using the human expert verification and correction module 242. For example, the human user can use a workstation (e.g., the computer system 224) with a user input (e.g., a keyboard or a mouse, which are not shown in FIG. 2) to analyze the "Suspicious" data.

The human expert verification and correction module 242 is programmed to correct (e.g., the status and/or the value of the incorrect data) the "Suspicious" data from the quarantine module 240. In one example, the human expert verification and correction module 242 is programmed to identify "Suspicious" data that should have been labeled as "Sound". For example, the human user can determine that the quarantined data with values of "8" and "10" should have been validated as being "Sound" data. It will be appreciated that the human user can determine which data should be labeled as "Sound" and which data should be labeled as "Suspicious." In some examples, since data with values of "3", "4", "5", and "6" are labeled as "Sound", the user can determine that the data with values of "8" and "10" should also be labeled as "Sound". In other examples, the user can determine that the data with a value of "8" should be labeled as "Sound", while the data with a value of "10" should remained labeled as "Suspicious". The human expert verification and correction module 242 is programmed to change the parameter ranges of the data, so that the ML integrity check module 230 correctly validates future statuses of the data as "Sound" instead of "Suspicious". In some examples, the changed data is transmitted directly to the transformation module 232. In other examples, the changed data is then transmitted to the ML integrity check module 230, where it is re-validated as "Sound" data, and subsequently sent to the transformation module 232. In further examples, the changed data can be sent to the training database 244, thereby training the ML integrity check module 230 to "learn" which data values should be labeled as "Sound."

Advantageously, since the ML integrity check level 230 learns which data should be labeled as "Sound", the amount of data entries in the quarantine module 240 is reduced and, thus, the amount of time a human user spends to correct the quarantined data using the human expert verification and correction module 242 is consequently reduced.

In another example, the human expert verification and correction module 242 can be further programmed to identify "Suspicious" data with an incorrect value. For example, the human user can determine that the quarantined data with values of "112" (and/or "10", as described previously) have an incorrect value. The human expert verification and correction module 242 is programmed to change the value of the data to a value within the "Sound" data range (e.g., ranging from "3" to "8"). The human expert verification and correction module 242 is programmed to change the parameter ranges of the data, so that the ML integrity check module 230 identifies the correct, true values of incorrect data entries. This corrected data is then sent to the training database 244, thereby training the ML integrity check module 230 to "learn" which data values are incorrect. The corrected data can then be transmitted to the ML integrity check module 230, where it is validated as "Sound" data, and subsequently sent to the transformation module 232.

Advantageously, since the ML integrity check level 230 learns which data values are incorrect, the amount of data entries in the quarantine module 240 is reduced and, thus, the amount of time a human user spends to correct the quarantined data using the human expert verification and correction module 242 is consequently reduced.

The transformation module 232 is programmed to aggregate the checked, validated data into a plurality of tables. For example, during the aggregation of the data, the transformation module 232 is programmed to rename or delete the columns of the data tables, and/or create and calculate new tables and columns. The transformation module 232 is further programmed to transmit the transformed data to the loading module 234.

The loading module 234 is programmed to load the plurality of tables transformed by the transformation module 232 into the DWH feed system 236 for storage therein.

In some examples, as described above, "Suspicious" data that has the status changed to "Sound" can be sent directly to the transformation module 232. As a result, this changed data is not sent to the training database 244, thereby reducing the capacity of the ML integrity check module 230 to learn. To correct this, the post-loading corrections module 238 sends this changed data from the DWH feed system 236 to the training database 244. Advantageously, this additional corrected data increases the learning capacity of the ML integrity check module 230.

In some embodiments, the data stored in the DWH feed system 236 can be displayed on a display 246. The display 246 can be a computer screen, an attached monitor, a television screen, and the like. The displayed data can include reports, charts, and graphs associated with the stored data.

The ML integrity check module 230 can be programmed to operate as a machine-learning module in three phases: (1) an initial phase; (2) a ramp-up phase; and (3) a stabilized phase, each of which is described below.

In the initial phase, the first loading processes (e.g., by the extraction module 228, the ML integrity check module 230, the transformation module 232, and the loading module 234) of the DWH feed system 236 occur. For example, data tables passing through the extraction module 228, the transformation module 232, and the loading module 234 are classified as "Sound" and "Suspicious" by the ML integrity check module 230 through an unsupervised manner. "Sound" and "Suspicious" data are treated as described above. However, some data integrity issues occur undetected by the ML Integrity Check, but can be detected through traditional ways (e.g., loading crashes, feedback from human users of the data, detection from downstream applications using data, etc.). Human experts will have to correct data and label corrected tables to enrich the training set (e.g., with the human expert verification and correction module 242).

In the ramp-up phase, the ML integrity check module 230 gains coverage through multiple data sets (e.g., training data or actual data). As a result, less and less integrity issues are detected, since more and more of the issues are now detected by the ML integrity check module 230.

In the stabilized phase, only some of the newly introduced integrity problems (i.e., new, incorrect data that has not been processed) stay undetected by the ML integrity check module 230. However, some of the new problems can be detected, despite being new. At the first occurrence, the training set is immediately completed. During the time period necessary for the correction of the root cause for the integrity problem, the ML integrity check module 230 ensures that no erroneous goes through and spreads to downstream users and applications.

In some embodiments, the computer system 224 can be divided into several subsystems. One such subsystem can include the extraction module 228, the transformation module 232, the loading module 234, the DWH feed system 236, and the post-loading corrections module 238. Another such subsystem can include the ML integrity check module 230 (e.g., including the quarantine module 240, the human expert verification and correction module 242, and the training database 244).

Advantageously, the ML integrity check module 230 includes a machine learning process with a simple 2-classes classification, thereby not inhibiting the normal processes (e.g., extraction, transformation, and loading) of the computer system 224. The feasibility of using machine learning techniques has been assessed by a trial of the Matrix Factorization method by Guillaume Bouchard.

A first set of data assembled by hand is given below. The idea behind these data is that each record represents thickness values of various locations on a semiconductor wafer, hence these values are supposed to be very close to each other within each record.

Without any prior information or any training phase, the Matrix Factorization method was able to detect the two values that were abnormal.

A second set of data provided below is intended to test the feasibility to check the integrity of time series. These data are an extract from a data warehouse where one abnormal value has been added by hand, and they also include an actual problematic series.

It will be appreciated that the use of the Matrix Factorization method (or any other type of ML techniques) is not restrictive, since the proposed computer system 224 can use any other Machine Learning algorithm relevant for the DWH feed system 236 at hand.

Detecting manually even such simple abnormalities can prove to be a problem with more traditional rule-based system. For example, the detection of too high or too low thickness values in the first set of data requires the use of thresholds that are too rigid. Advantageously, the ML integrity check 230 performs analysis on data sets and abnormalities that are simple but qualitatively in line with real integrity problems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method associate with an Extract-Transform-Load (ETL) system for performing automated data quality checks on an associated data warehouse (DWH) feed operatively associated with the ETL system, the ETL system including a processor in communication with a memory configured to perform the method comprising:

extracting, with an extraction module operatively associated with the ETL system, data from a plurality of source databases and source files associated with the DWH feed;

automatically validating, with a machine-learning integrity check module operatively associated with the ETL system configured to execute a machine-learning algorithm associated with a 2-class data classifier, the extracted data by classifying and assigning an integrity status including one of sound and suspicious thereto;

transmitting data with a status of sound to a transformation module operatively associated with the ETL system;

transmitting data with a status of suspicious to a quarantine module operatively associated with the ETL system;

transforming, with the transformation module, the validated data classified and assigned as sound into at least one temporary table; and loading, with a loading module operatively associated with the ETL system, transformed data into a data warehouse feed system associated with the DWH feed for storage;

wherein the ETL system transmits data classified as suspicious from the quarantine module to a human expert verification and correction module, the human expert verification and correction module determining if the suspicious data is one of valid and corrupt, and if the suspicious data is determined to be valid manually reclassifying the suspicious data as sound and including the suspicious data in a training set database operatively associated with training the 2-class classifier to further train the 2-class classifier to classify the manually reclassified suspicious data as sound, and if the suspicious data is determined to be corrupt, correcting the suspicious data.

2. The method of claim 1, further including:

identify, with the human expert verification and correction module, data with a status of suspicious that has incorrect values;

correct, with the human expert verification and correction module, the value of the identified data; and change, with the human expert verification and correction module, the status of the changed data from suspicious to sound.

3. The method of claim 2, further including:

transmitting, with the correction module, data with a status of sound to the training set database when the data is loaded into the data warehouse feed system.

4. The method of claim 1, further including at least one of:

with the extraction module, gathering the extracted data from the plurality of source databases and source files into a uniform format;

with the transformation module, aggregating the checked data into a plurality of tables; and with the loading module, loading the plurality of tables into the data warehouse feed system.

5. The method according to claim 1, wherein the machine-learning algorithm is a Matrix Factorization Method.

6. A computer program product comprising a non-transitory recording medium storing instructions for performing the method of claim 1, and a processor in communication with the non-transitory recording medium that implements the instructions.

7. An Extract-Transform-Load (ETL) system for performing automated data quality checks on an associated data warehouse (DWH) feed operatively associated with the ETL system, the ETL system comprising:

an extraction module operatively associated with the ETL system programmed to extract data from a plurality of source databases and source files associated with the DWH feed;

a machine-learning integrity check module operatively associated with the ETL system configured to execute a machine learning algorithm associated with a 2-class data classifier and programmed to automatically validate the extracted data by classifying and assigning an integrity status including one of sound and suspicious thereto, and the ETL system configured to transmit data with a status of sound to a transformation module operatively associated with the ETL system and transmit data with a status of suspicious to a quarantine module operatively associated with the ETL system;

a transformation module operatively associated with the ETL system programmed to transform the validated data classified and assigned sound into at least one temporary table;

a loading module operatively associated with the ETL system programmed to load the transformed data into a data warehouse feed system associated with the DWH feed for storage; and a display operatively associated with the ETL system and DWH feed system configured to display the stored data, wherein the ETL system is configured to transmits data classified as suspicious from the quarantine module to a human expert verification and correction module, the human expert verification and correction module configured to determine if the suspicious data is one of valid and corrupt, and if the suspicious data is determined to be valid manually reclassifying the suspicious data as sound and including the suspicious data in a training set database operatively associated with training the 2-class classifier to further train the 2-class classifier to classify the manually reclassified suspicious data as sound, and if the suspicious data is determined to be corrupt, correcting the suspicious data.

8. The system of claim 7, wherein the human expert verification and correction module is further programmed to:

identify data with a status of suspicious that has incorrect values;

correct the value of the identified data; and change the status of the changed data from suspicious to sound.

9. The system of claim 8, wherein the human expert verification and correction module is further programmed to:

transmit data with a status of sound to the training set database when the data is loaded into the data warehouse feed system.

10. The system of claim 7, wherein at least one of:

the extraction module is further programmed to gather the extracted data from the plurality of source databases and source files into a uniform format;

the transformation module is further programmed to aggregate the checked data into a plurality of tables; and the loading module is further programmed to load the plurality of tables into the data warehouse feed system.

* * * * *